United States Patent [19]
Constantine

[11] Patent Number: 5,001,598
[45] Date of Patent: Mar. 19, 1991

[54] SINTER CONTROL ADDITIVE

[75] Inventor: John C. Constantine, Chatham, N.J.

[73] Assignee: Engelhard Corporation, Iselin, N.J.

[21] Appl. No.: 340,952

[22] Filed: Apr. 20, 1989

[51] Int. Cl.⁵ .................. H01G 1/01; H01G 4/10; H01G 7/00; H01B 1/06
[52] U.S. Cl. .................. 361/305; 361/321; 252/520; 29/25.42
[58] Field of Search .............. 338/308; 204/38.4, 38.1; 252/520; 427/229; 361/321, 304, 305, 308, 309, 310

[56] References Cited
U.S. PATENT DOCUMENTS

| | | | |
|---|---|---|---|
| 3,118,095 | 1/1964 | Baron et al. | 361/321 X |
| 4,082,906 | 4/1978 | Amin et al. | 361/321 X |
| 4,363,332 | 1/1987 | Craig et al. | 252/520 |
| 4,435,738 | 3/1984 | Barber et al. | 361/321 |
| 4,811,162 | 3/1989 | Maher et al. | 361/308 |

Primary Examiner—Donald A. Griffin

[57] ABSTRACT

A sinter control material which is added to silver or palladium silver powders used for internal electrodes within multilayer ceramic capacitors is described. Iridium and rhodium resinates are disclosed as the additives.

47 Claims, 8 Drawing Sheets

SINTER CONTROL ADDITIVE

BACKGROUND OF THE INVENTION

The present invention relates to the manufacture of multilayer ceramic capacitors (MLC's) and particularly to silver and palladium silver powders which are used to form the internal electrodes within the MLC's. MLC's are typically made by laminating together a number of layers of a dielectric tape onto which internal electrodes have been screen printed. The laminated block is cut or diced apart to form the individual MLC's which are then fired at high temperatures. The dielectric tape is made by making a slurry of a ceramic dielectric powder such as $BaTiO_3$ or lead magnesium tungsten niobates and an acrylic or polyvinyl butyrol resin in a fast evaporating liquid or solvent. The slurry is cast onto glass plates, plastic sheets or metal belts and then dried to form a thin tape or film about 1.0 to 2.0 ml. thick. Internal electrode inks are made by dispersing the fine metal powders typically 1.0 to 5.0 microns average particle size, into a vehicle system of resins and solvents. This ink is screen printed onto the dielectric tape in a pattern which is determined by the final size of the capacitor that is desired. A monolithic block is then formed by stacking layers of the tape on each other according to a predetermined number based on the desired capacitance and then the stack is laminated under heat and pressure. The stack or block is then cut up into individual MLC's. The MLC's are then slowly heated over a period of generally 12 to 48 hours to a temperature of about 300° to 350° C. This heating cycle is referred to as a binder burnout cycle and is used to remove most of the organic components from the MLC's by slowly burning them out prior to firing. After the organics have been removed, the MLC's are fired in a kiln to a temperature which is determined by the dielectric composition and usually ranges from 1150° to 1350° C.

During the firing cycle, the MLC's are very weak because the organic binders have been removed and are therefore susceptible to damage by stresses such as mechanical shock, differentials in sintering rates and thermal shock, due to rapid heating. As the temperature is raised during the firing cycle, the internal electrode powders sinter and shrink about 20 percent in the 500° to 850° C. range. During this period, the dielectric undergoes very little change. As the temperature continues to rise, the dielectric then sinters and shrinks about 20 percent in the 850° to 1100° C. range. Because the two materials sinter at different temperatures or times, stress is developed in the MLC's which causes the different layers of materials to separate and result in defects which are referred to as delaminations or "delams". The delams are quite often the site for subsequent failure in the MLC. This delamination problem is minimized as much as possible by careful selection of internal electrode powders, binder systems and process controls. Unfortunately, these become very restrictive to the manufacturer because of excessive times for certain operations such as binder burn-out or very narrow processing windows for different operations involving temperatures and times.

Figure 1:
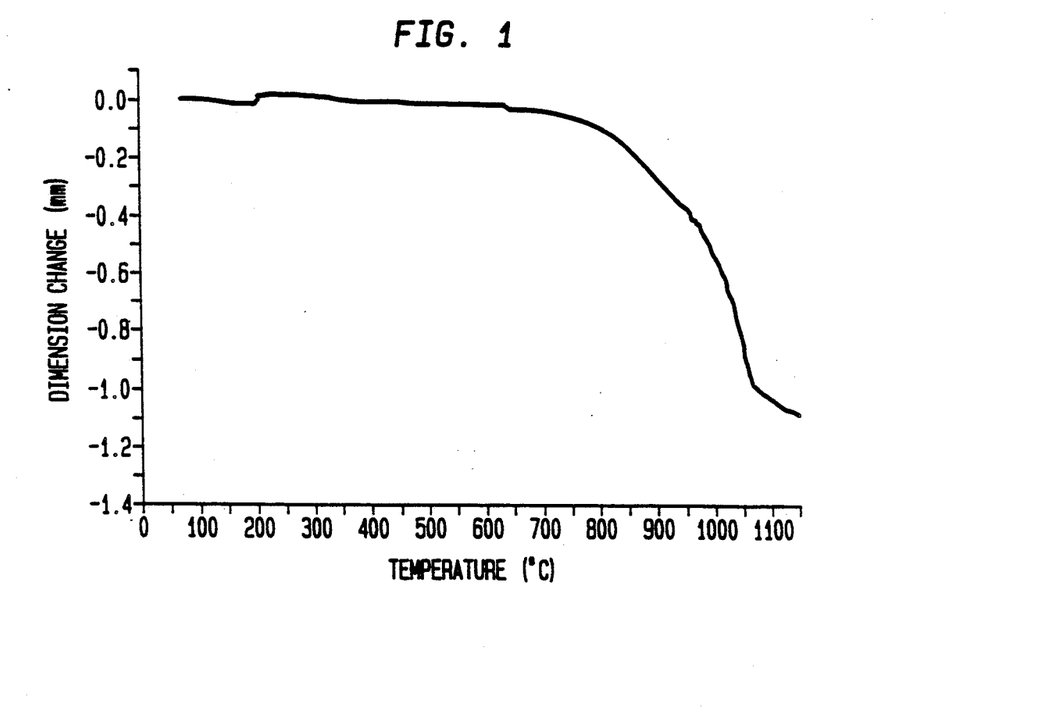
Figure 2:
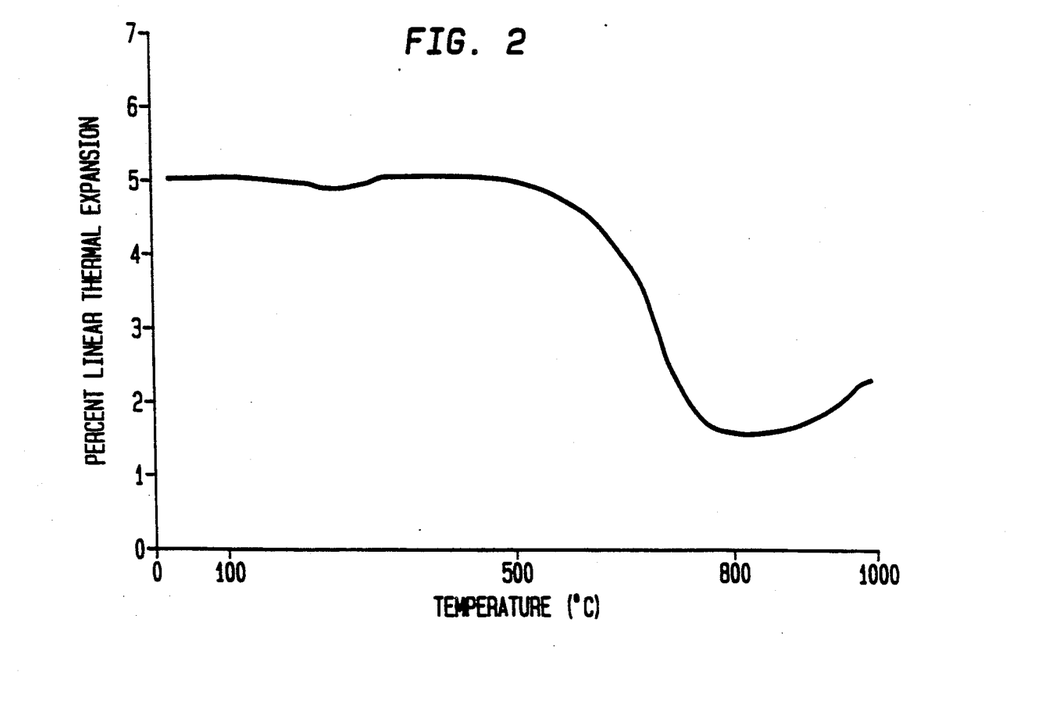

To further complicate the problem, palladium oxidizes and then is reduced during the firing cycle in the 300° to 600° C. range depending on the amount of silver being used in the electrode. In the case of substantially pure palladium, it is reduced at a temperature of about 800° C. The palladium oxide formation results in the expansion of the electrode by 15 to 50 percent and the deoxidation causes the electrode to contract that much after which sintering begins to occur immediately. This expansion and contraction further stresses the MLC's and contributes to delams. FIG. 1 is a dilatometer trace of a typical dielectric powder which fires at 1150° C. and FIG. 2 is a trace of a typical internal electrode powder. The traces show the temperature ranges over which the sintering occurs for the two materials. Previous solutions in addition to careful selection of electrode powders vehicles and processes include prealloying and preoxidizing the powders. See, for example, U.S. Pat. No. 4,500,368.

SUMMARY OF THE INVENTION

The present invention is directed to materials and a method for modifying the rate at which the sintering occurs in the internal electrode powder such that much of the sintering takes place at temperatures higher than normal. This allows about 50 percent of the sintering of the internal electrode powder to occur at the same time that the dielectric is sintering. This is accomplished by adding to the internal electrode powder any of iridium, rhodium or mixtures thereof in the form of a metallo organic resinate, which are deposited directly on the silver and palladium powders and mixtures thereof. Since the sintering occurs much slower and over a much wider temperature range and at least partially while the dielectric is sintering, the stress levels developed during firing are much less than exhibited by MLC's produced according to the prior art. This reduction in stress will reduce the tendency for the MLC's to delaminate and give the manufacturer wider latitudes on materials and processes and result in higher yields in marginal processes.

Specifically, in accordance with the present invention there is provided an internal electrode material consisting essentially of an internal electrode powder selected from the group consisting of silver and mixtures of silver and palladium, and a sinter control additive selected from the group consisting of one or both of an iridium metallo organic resinate and a rhodium metallo organic resinate. The sinter control additive is present in an amount sufficient to modify the sintering rate of the internal electrode powder so that the sintering occurs slower and over a wider temperature range as compared to the internal electrode powder without the sinter control additive.

Another aspect of the present invention provides a process for modifying the sintering rate of an internal electrode material. The process comprises adding to a conductive powder selected from the group consisting of silver and mixtures of palladium and silver, a sinter control additive selected from the group consisting of one or both of a rhodium metallo organic resinate and an iridium metallo organic resinate in an amount sufficient to modify the sintering rate of the internal electrode material so that the sintering occurs slower and over a wider temperature range as compared to the internal electrode powder without the sinter control additive.

Another aspect of the invention provides that the sinter control additive is present in an amount from about 0.1 to 1.0 percent by weight of the internal electrode material, e.g., in an amount of from about 0.1 to 0.5 percent by weight of the internal electrode material.

DETAILED DESCRIPTION OF THE INVENTION

According to the present invention, the modification of the sintering rate of the internal electrode powder is achieved by coating the particles of the internal electrode powder, whether they are silver or a mixture of palladium and silver particles with iridium or rhodium in the form of a metallo organic resinate such that about 0.1 to 10 percent by weight of either iridium or rhodium metal is deposited on the particles when the metallo organic is decomposed during binder burnout or firing cycles. Unless otherwise specified, percent by weight of the iridium or rhodium resinate refers to the percent of iridium or rhodium metal in the electrode powder after milling and after binder burn-out firing cycles. It does not refer to the percent by weight of the iridium or rhodium resinate added to the powder prior to milling. Modification of the sintering rate is achieved in 100 percent silver powders and palladium silver powders. The effort is best seen at ratios of 60/40–0/100 palladium to silver. The effect is progressly less at higher ratios of palladium. Iridium and rhodium have not shown any effect on modifying the sintering rate of 100 percent palladium powders.

Depending on the manner of preparation of the silver palladium electrode powder, the iridium or rhodium sintering additive can be added in a variety of ways. It is, however, presently preferred to prepare the palladium and silver particles by a vibratory milling procedure which results in palladium silver powders with a very low or zero fineness of grind value. Other techniques such as micronizing and ball milling may be used to prepare the powders. When using the micronizing technique, the sinter control additive is applied to the particles by precoating the metal powder by adding the powder to the solvent and then drying the powder prior to micronizing. When using a ball milling technique, the sinter control additive is added during the ball milling process. It has been found that the sinter control additive may be added after the milling process and mixed with the milled powder by a suitable technique. Alternatively, a powder may be milled without the addition of a sinter control additive. The powder may then be formed into an ink by mixing in the sinter control additive and a suitable medium containing solvents and thickeners. The ink is preferably formed by mixing on a three roll mill although other suitable means may be employed. The milled powder containing the sinter control additive may also be formed into an ink by mixing it with a suitable medium.

Generally, the vibratory milling process comprises vibratory milling powders with small ($-10/+20$) mesh zirconia beads, a lubricant which is typically a saturated or unsaturated fatty acid such as lauric, stearic, palmitic, myristic or capric acid and a solvent such as ethyl acetate, turpentine, esters, aliphatic hydrocarbons, alcohols, terpenes, aromatic hydrocarbons and mixtures thereof with a fast drying rate for easy removal after milling. The vibratory milling deagglomerates the powders and coats the spheres with the lubricant so they may be easily dispersible when made into an ink. The milling may be carried out in any suitable milling device although a Sweco mill is presently preferred. When the vibratory milling process is used to prepare the internal electrode powders, as is presently preferred, the iridium or rhodium metallo organic resinate is added during the vibratory milling procedure.

Metallo organic resinates according to the present invention are compounds comprising a central metal ion linked to ligands, such as organic and inorganic molecules through a hetero atom bridge. The resinates include both naturally occurring resinates (rosin) and synthetic resinates such as, for example, carboxylates having the general formula:

wherein R is a hydrocarbon containing 8 to 20 carbon atoms and $M^{+n}$ is a central metal ion with valence $+n$; alcoholates having the general formula:

wherein R is a hydrocarbon containing 8 to 20 carbon atoms and $M^{+n}$ is a central metal ion with valence $+n$, metal mercaptides having the formula:

wherein R is a hydrocarbon moiety containing 8 to 16 carbon atoms and M is a central metal ion with valence $+n$; metallo-organic compounds having two different types of ligands having the general formula:

wherein R is a hydrocarbon moiety containing 8 to 16 carbon atoms and M is a central metal ion with valence $+n$; compounds containing aldehyde functional groups having the formula:

wherein R is a hydrocarbon moiety containing 8 to 16 carbon atoms and M is a central metal ion; and alkoxides having the formula:

wherein R is a hydrocarbon moiety containing 8 to 16 carbon atoms and M is a central metal ion with valence $+n$.

It is presently preferred to use iridium trichloride-tris-di-n-butylsulfide and rhodium 2-ethylhexoate, although any rhodium or iridium metallo organic resinate which will decompose to coat the internal electrode powders with iridium or rhodium could be used. The metallo organic resinates are added such that 0.1 to 10.0 weight percent and more preferably 0.1 to 0.5 weight percent iridium or rhodium per weight of internal electrode powder is obtained after decomposition after the burn-out and firing cycle, with about 0.1 to 0.25 weight percent being the preferred amount for the rhodium metallo organic and about 0.25 to 0.5 weight percent being the preferred amount for the iridium metallo organic resinate. The iridium and rhodium resinates may also be added as a mixture. It is presently preferred to employ a mixture having a ratio of Ir:Rh of from about 6:1 to about 0.65:1, although other ratios may be used.

After the vibratory milling and the addition of the metallo organic resinate, the resultant powder is dried. While any suitable drying means may be employed, it is presently preferred to dry the powder by rotary vacuum drying or on a steam table.

Then, the MLC goes through the binder burn-out cycle. The binder burn-out cycle is generally carried out over a period of 12-24 hours at a temperature starting at room temperature and increasing to 300°-400° C. Immediately thereafter, the MLC goes through a firing cycle. During the firing cycle for the MLC, the rhodium or iridium which are insoluble in the silver act as a barrier to the interdiffusion of palladium and silver between the particles. The firing cycle is generally carried out over a period of 6-12 hours at a temperature of 1050°-1250° C. depending upon the dielectric. The interdiffusion normally occurs fairly rapidly right after the palladium deoxidizes. The diffusion of palladium and silver intergranularly to form the alloy solid solution phase should still proceed as if no additive was included. This barrier effect does not prevent the diffusion from occurring but only slows the process so that the sintering process occurs at a much slower rate. During the binder burn-out cycle and the firing cycle, the iridium or rhodium metallo organic decomposes and coats the palladium silver powder with very fine iridium or rhodium particles.

Examples of the effect of the iridium or rhodium on the palladium silver powders can best be shown by the results from a dilatometer or thermomechanical analyzer (TMA). In the figures, the amount of shrinkage is only relative as the results are effected by such things as sample size, initial density of the pressed pellet used in the apparatus and the piece of equipment used. The area of interest is the temperature regions in which the shrinkage occurs.

EXAMPLE 1

A palladium silver internal electrode powder containing 30 percent by weight palladium and 70 percent by weight silver was made according to the prior art using a vibratory milling process. First, 100 grams of powder, 0.7 g of Stearic Acid, 55 g of Ethyl Acetate, 55 g of Lactol Spirits and 900 g of $ZrO_2$ grinding beads are all added to a Sweco mill can and milled for 1 hour. The powder was then drained into a porcelain dish removing the $ZrO_2$, dried on a steam table at about 85° C. and sieved −100 mesh. To test the powder, 7 g of powder was pressed into a pellet ¼" by ¼". The resulting pellet was put into a dilatometer and heated up at approximately 5° C. per minute from room temperature to 1000° C. FIG. 2 shows the trace from a dilatometer for this powder. As can be seen, all of the shrinkage occurs in the 500° to 800° C. temperature range. The increase in sample length in the 800° to 1000° C. temperature range is not understood at this time but is thought to be caused by blistering within the pellet due to entrapped gases from palladium reduction. This does not occur in all samples especially when the final densification temperature is above 850° C.

EXAMPLE 2

A 30 percent palladium, 70 percent silver powder was made by the same vibratory milling process as described in Example 1, except that 0.25 weight percent rhodium as 2-ethylhexoate was added during the milling process. The following materials were added to the Sweco mill can:

48.0 g powder; 0.35 g Stearic Acid; 32.5 g Lactol Spirits; 32.5 g Ethyl Acetate; 0.85 g Rh Resinate (the rhodium metal content of this resinate was 14%) and 400 g $ZrO_2$ beads. The resulting powder was tested in the dilatometer as in Example 1.

Figure 3:
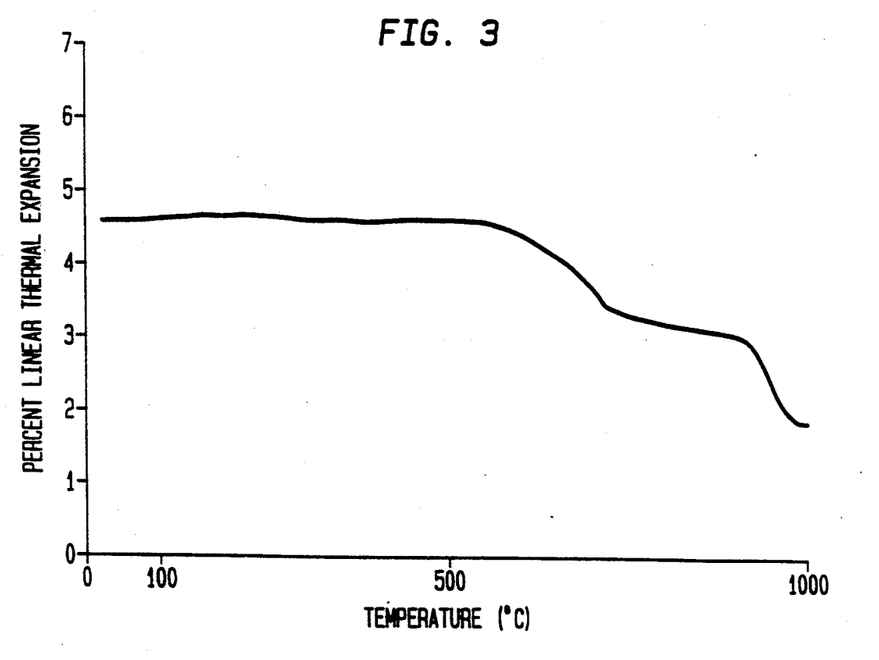

As can be seen from FIG. 3, 50 percent of the shrinkage occurs in the 550° to 750° C. range while all of the shrinkage occurred in that range in FIG. 2, wherein the prior art composition was used. The remaining 50 percent of the shrinkage occurs in the 750° to 1000° C. range. This is also the range in which substantially all the shrinkage occurs in the dielectric as can be seen in FIG. 1.

EXAMPLE 3

A 30 percent palladium, 70 percent silver powder was made by the same vibratory milling process as described in Example 1, except that 0.5 weight percent iridium as trichloride-tris-di-n-butylsulfide was added during the milling process. The resulting powder was tested in a dilatometer as in Example 2. The following materials were used, all of which were milled together:

50.0 g metal powder; 0.35 g Stearic Acid; 32.5 g Lactol Spirits; 32.5 g Ethyl Acetate; 1.15 g Ir Resinate (the resinate contains 24% Ir metal) and 400 g $ZrO_2$ beads.

Figure 4:
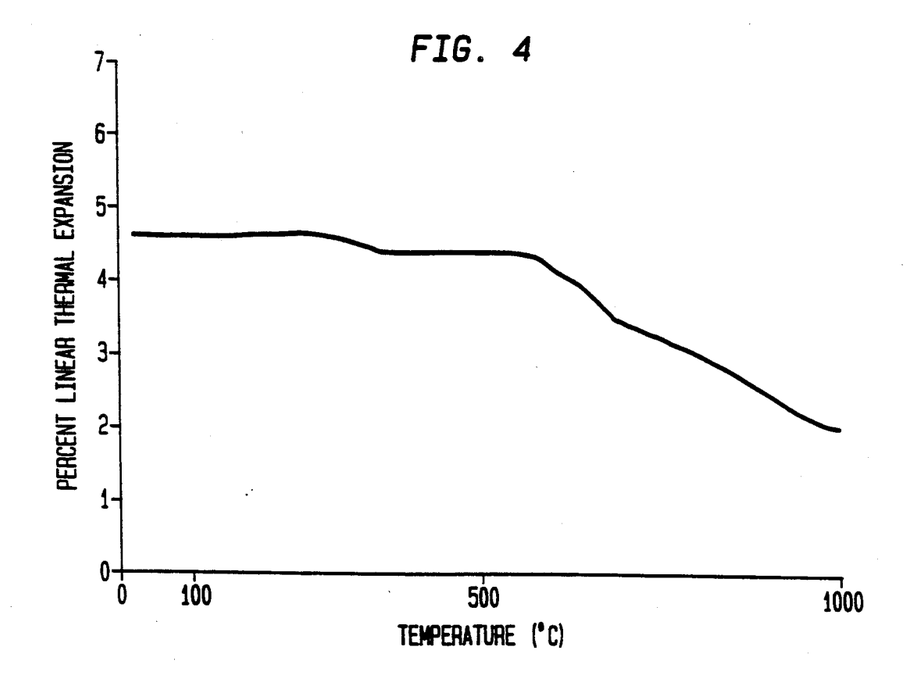

As can be seen from FIG. 4, substantially all of the shrinkage occurs between 550° and 1000° C. There is a small amount of shrinkage that occurs around 300° C. but that is due to the decomposition of the metallo organic phase and the lubricant used in the milling.

EXAMPLE 4

Two separate palladium silver powders were made by the same vibratory milling process as described in Example 1, except that the ratio of palladium to silver was 60 weight percent palladium, 40 weight percent silver. To one of the palladium silver powders (Material A) was added during the vibratory milling process 0.51 weight percent rhodium as 2-ethylhexoate and to the other (Material B) was added 0.55 percent iridium as trichloride-tris-di-n-butylsulfide. Material A was made using the following materials, all of which were milled together:

50 g metal powder; 0.35 g Stearic Acid; 32.5 g Lactol Spirits; 32.5 g Ethyl Acetate; 1.15 g Ir Resinate (the resinate contains 24% Ir metal) and 400 g $ZrO_2$ beads.

Material B was made using the following materials:

50 g metal powder; 0.35 g Stearic Acid; 32.5 g Lactol Spirits; 32.5 g Ethyl Acetate; 1.70 g Rh Resinate (the resinate contains 14% Rh metal) and 400 g $ZrO_2$ beads.

Material C (the control made without a sinter control additive) was made using the following materials:

50 g metal powder; 0.35 g Stearic Acid; 32.5 g Lactol Spirits; 32.5 g Ethyl Acetate and 400 g $ZrO_2$ beads.

Figure 5:
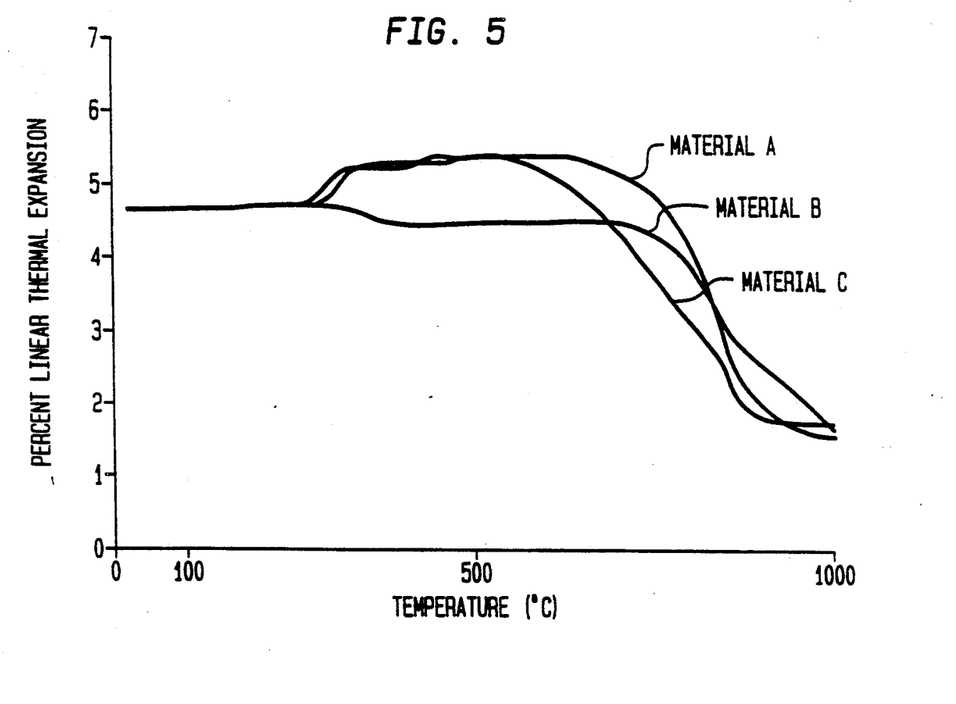

FIG. 5 shows the shrinkage results of Materials A-C.

EXAMPLE 5

Two palladium silver powders were prepared by the same vibratory milling process as described in Example 1, except that the ratio of palladium to silver for each powder was 15 percent palladium, 85 percent silver. During the milling process, 0.5 percent of rhodium as 2-ethylhexoate was added to the powder (Material A) and 0.5 weight percent iridium as trichloride-tris-di-n-butylsulfide was added to the other powder (Material B). Materials A and B, along with a control (Material C) were tested in a dilatometer as described in Example 1.

Material A was made from the following materials, all of which were milled together:

50 g metal powder; 0.35 g Stearic Acid; 32.5 g Lactol Spirits; 32.5 g Ethyl Acetate; 1.15 g Ir Resinate (the resinate contained 24% Ir metal) and 400 g $ZrO_2$ beads.

Material B was made from the following materials, all of which were milled together:

50 g metal powder; 0.35 g Stearic Acid; 32.5 g Lactol Spirits; 32.5 g Ethyl Acetate; 1.70 g Rh Resinate (the resinate contained 14% Rh metal) and 400 g $ZrO_2$ beads.

Material C was made from the following materials, all of which were milled together:

50.g metal powder; 0.35 g Stearic Acid; 32.5 g Lactol Spirits; 32.5 g Ethyl Acetate and 400 g $ZrO_2$ beads.

Figure 6:
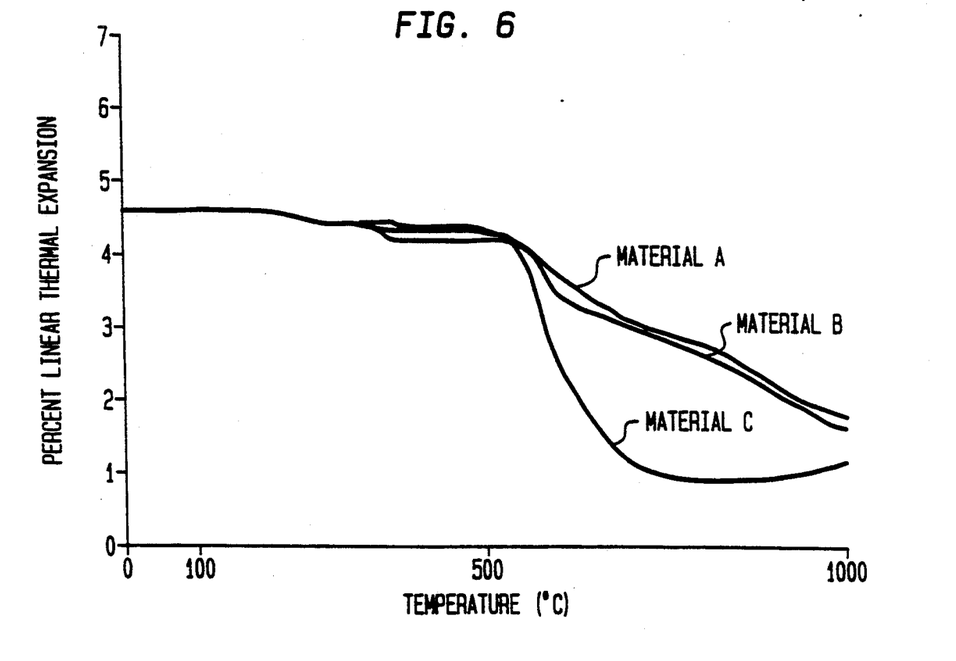

FIG. 6 shows the shrinkage results of Materials A-C of this Example.

EXAMPLE 6

During a vibratory milling process as described in Example 1, 0.25 percent rhodium as 2-ethylhexoate was added to a substantially 100 percent silver powder (Material A). Another silver powder was prepared by the same technique except that 0.5 percent iridium as trichloride-tris-di-n-butylsulfide was added (Material B). Materials A and B along with a Control (Material C) were tested in a dilatometer as described in Example 1.

Material A was made from the following materials, all of which were milled together:

200 g metal powder; 1.4 g Stearic Acid; 130 g Lactol Spirits; 130 g Ethyl Acetate; 3.4 g Rh Resinate (the resinate contained 0.25% Rh metal); 0.2 g Sulfur* and 1600 $ZrO_2$ beads.

* The Sulfur is added to silver to prevent formation of large lumps.

Material B was made from the following materials, all of which were milled together:

200 g powder; 1.4 g Stearic Acid; 130 g Lactol Spirits; 130 g Ethyl Acetate; 4.35 g Ir Resinate (the resinate contained 24% Ir metal); 0.2 g sulfur* and 1600 g $ZrO_2$ beads.

Material C was made from the following materials, all of which were milled together:

200 g powder; 1.4 g Stearic Acid; 130 g Lactol Spirits; 130 g Ethyl Acetate; 0.2 g Sulfur* and 1600 g $ZrO_2$ beads.

Figure 7:
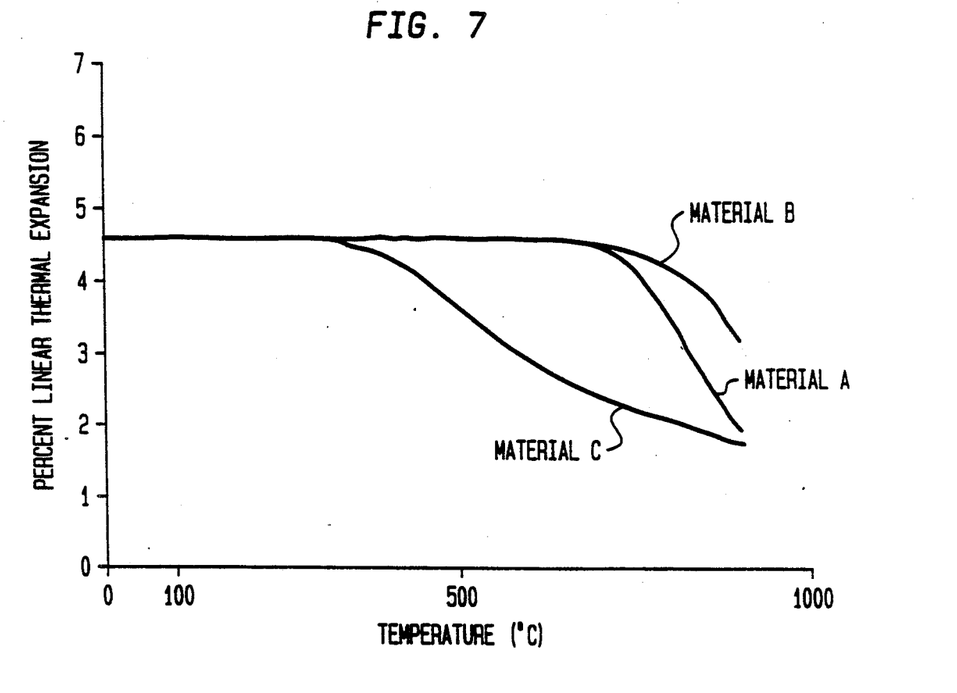

FIG. 7 describes the shrinkage results of Materials A-C. The additions to pure silver produce significant changes in the sintering rates and the total additions may have to be reduced to obtain a desirable effect for use in low fired multilayer capacitors.

The following Examples describe mixtures of iridium and rhodium sinter control additives:

EXAMPLE 7

A 30% palladium, 70% silver powder was made by the same vibratory milling process as described in Example 1, except that a mixture of 0.25 weight percent iridium as iridium trichloride-tris-di-n-butylsulfide and 0.12 weight percent rhodium as 2-ethylhexoate was added to the powder during the milling process. The resulting powder was tested in a dilatometer as in Example 1. The following materials were used to make up the powder, all of which were milled together:

50.0 g Silver/Palladium Powder; 0.35 g Stearic Acid; 32.5 g Lactol Spirits; 32.5 g Ethyl Acetate; 400 g $ZrO_2$ beads; 0.47 g Rh Resinate (the resinate contained 14% Rh metal) and 0.57 g Ir Resinate (the resinate contained 24% Ir metal).

Figure 8:
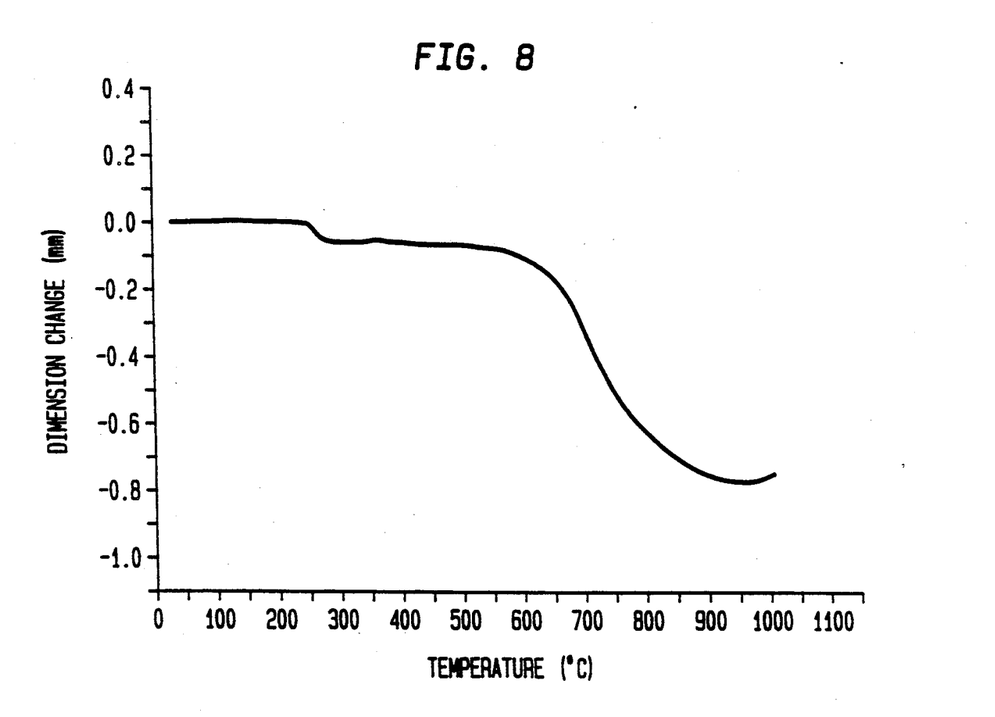

FIG. 8 shows the shrinkage of the powder of this Example after testing in a dilatometer.

EXAMPLE 8

A 30% palladium, 70% silver powder was made by the same vibratory milling process as described in Example 1, except that a mixture of 0.35 weight percent iridium as iridium trichloride-tris-di-n-butylsulfide and 0.06 weigh percent rhodium as 2-ethlyhexoate was added to the powder during the milling process. The resulting powder was tested in a dilatometer as in Example 1. The following materials were used to make up the powder, all of which were milled together.

50.0 g Silver/Palladium Powder; 0.35 g Stearic Acid; 32.5 g Lactol Spirits; 32.5 g Ethyl Acetate; 400 g $ZrO_2$ beads; 0.64 g Rh Resinate (the resinate contained 14% Rh metal) and 0.29 g Ir Resinate (the resinate contained 24% Ir metal).

Figure 9:
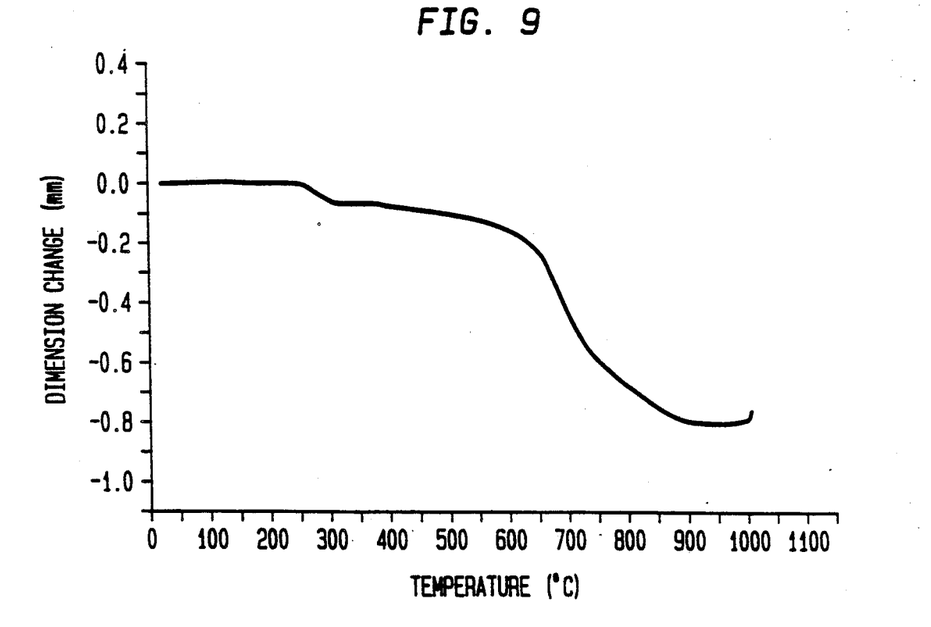

FIG. 9 shows the shrinkage of powder of this example after testing in a dilatometer.

EXAMPLE 9

A 30% palladium, 70% silver powder was made by the same vibratory milling process as described in Example 1, except that a mixture of 0.12 weight percent iridium as iridium trichloride-tris-di-n-butylsulfide and 0.18 weight percent rhodium as 2-ethlyhexoate was added to the powder during the milling process. The resulting powder was tested in dilatometer as in Example 1. The following materials were used to make up the powder, all of which were milled together:

50.0 g Silver/Palladium Powder; 0.35 g Stearic Acid; 32.5 g Lactol Spirits; 32.5 g Ethyl Acetate; 400 g $ZrO_2$ beads; 0.21 g Rh Resinate (the resinate contained 14% Rh metal) and 0.87 g Ir Resinate (the resinate contained 24% Ir metal).

Figure 10:
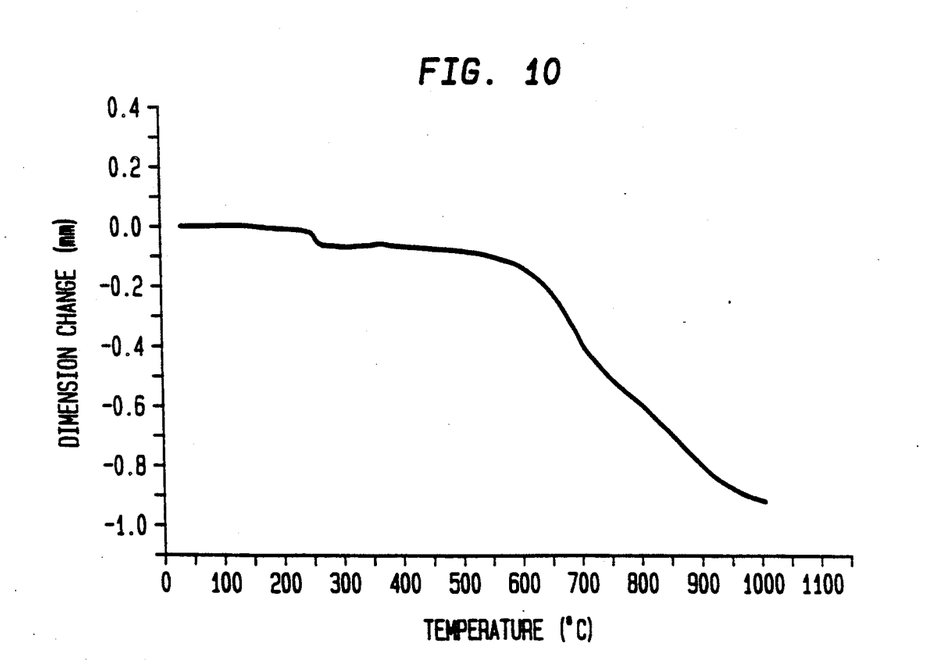

FIG. 10 shows the shrinkage of powder of this example after testing in a dilatometer.

EXAMPLE 10

A 30% palladium, 70% silver powder was made by the same vibratory milling process as described in Example 1, except that a mixture of 0.25 weight percent iridium as iridium trichloride-tris-di-n-butylsulfide and 0.25 weight percent rhodium as 2-ethylhexoate was added to the powder during the milling process. The resulting powder was tested in a dilatometer as in Example 1. The following materials were used to make up the powder, all of which were milled together:

50.0 g Silver/Palladium Powder; 0.35 g Stearic Acid; 32.5 g Lactol Spirits; 32.5 g Ethyl Acetate; 400 g $ZrO_2$ beads; 0.85 g Rh Resinate (the resinate contained 14% Rh metal) and 0.58 g Ir Resinate (the resinate contained 24% Ir metal).

Figure 11:
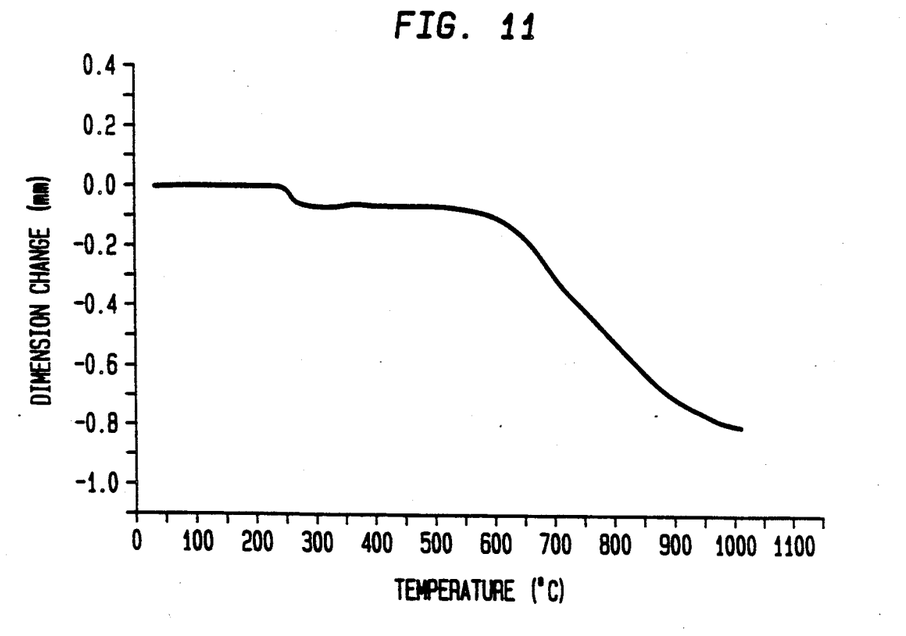

FIG. 11 shows the shrinkage of the powder of this example after testing in a dilatometer.

EXAMPLE 11

A 30% palladium, 70% silver powder was made by the same vibratory milling process as described in Example 1 and contained the same ingredients. After the milling operation, 0.6 g of an iridium resinate, iridium trichloride-tris-di-n-butylsulfide (the resinate contained 24% by weight iridium metal) was added to the powder together with 18.0 g of a medium so as to form an ink. The medium contained 8% by weight EHEC®, an ethyl hydroxyethylcellulose, manufactured by Hercules, 16% by weight Hercolyn D®, a hydrogenated methyl ester of rosen, manufactured by Hercules, 1.5% by weight Drapex ® 4.4, an octyl expoxy tallate, manufactured by Argus Chemical Corporation, 8% by weight Staybelite ® resin, a hydrogenated wood rosin, manufactured by Hercules, 15.5% Varsol 3 ®, an aliphatic petroleum solvent mixture, manufactured by Exxon, 6% by weight HSB ® solvent, an aromatic petroleum solvent, manufactured by Amsco and 45% by weight Shell solvent No. 71, an aliphatic hydrocarbon solvent, manufactured by Shell Oil Corporation. The powder, resinate and the medium were all mixed together on a three roll mill to form an ink. An additional 3.9 g of the medium was added during the three roll milling process to adjust the viscosity of the ink. A portion of the ink was then air dried and formed into a pellet and then tested in a dilatometer as in Example 1.

Figure 12:
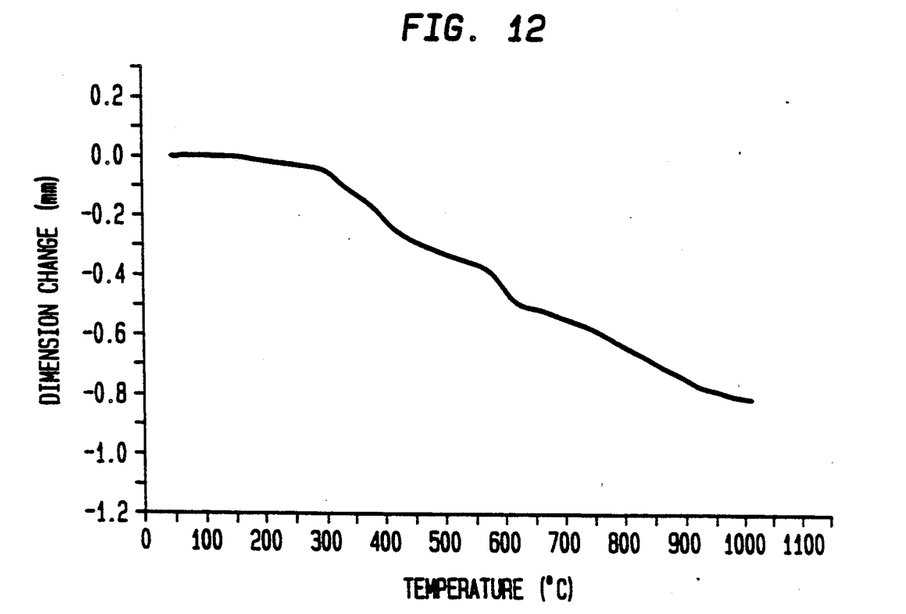

FIG. 12 shows the shrinkage of the material of example after testing in a dilatometer.

EXAMPLE 12

In this example, three (3) inks were formed from the powders made in Example 1, Example 2 and Example 3. Each ink was made the same way. Thus, the powder was mixed with a medium, which is the same medium as described in Example 11 and to that medium additional medium was added (Post Ad) during the three roll milling process to obtain the proper viscosity for the ink. The amounts of materials added are shown in Table 2 below:

|  | MATERIAL A | MATERIAL B | MATERIAL C |
| --- | --- | --- | --- |
| Example 1 Powder | 27.5 g | — | — |
| Example 2 Powder | — | 27.5 g | — |
| Example 3 Powder | — | — | 27.5 g |
| Medium | 18.0 g | 18.0 g | 18.0 g |
| Post ad | 4.5 g | 4.5 g | 4.5 g |

Figure 13:
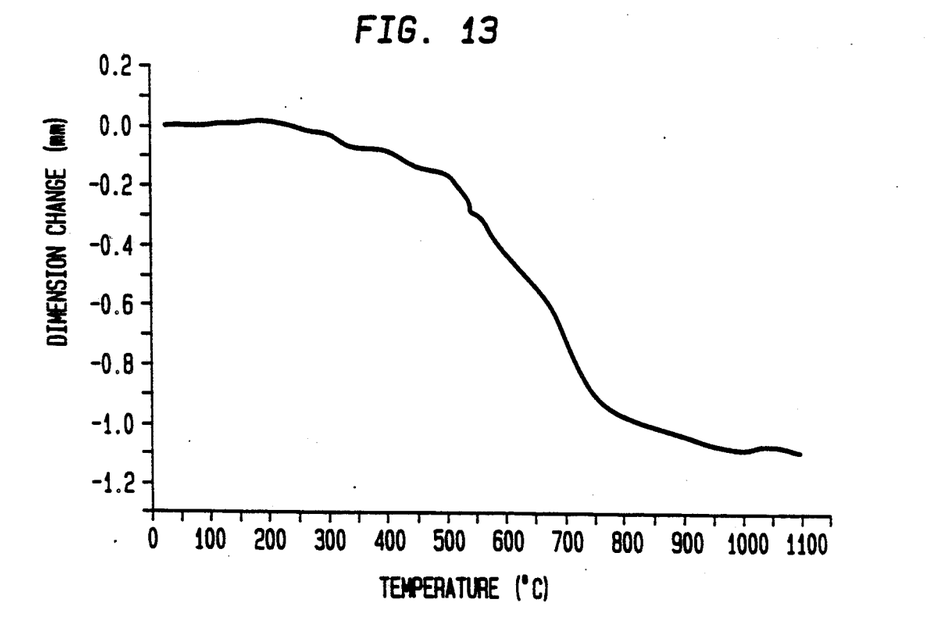
Figure 14:
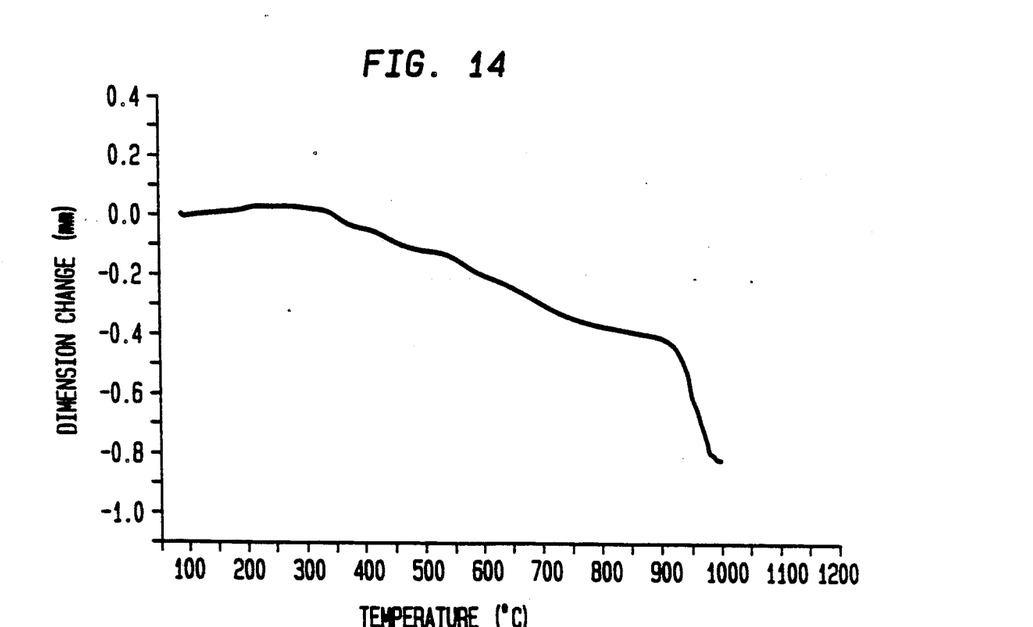
Figure 15:
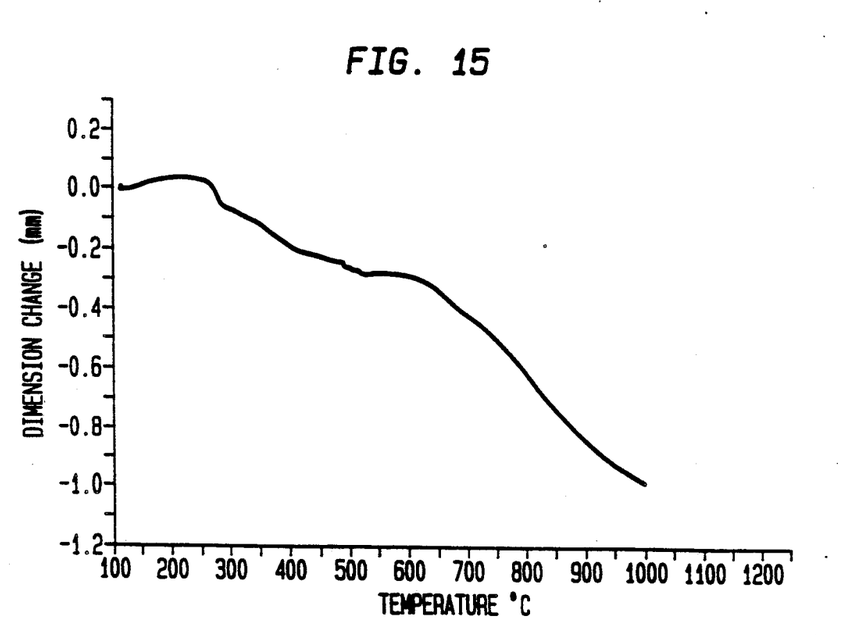

After the three roll milling process was completed and the ink was formed, a sample of each of the inks was taken and air dried and formed into a pellet. The pellet was then tested in a dilatometer for shrinkage. The results of the dilatometer test are shown in FIG. 13 (Material A), FIG. 14 (Material B), and FIG. 15 (Material C).

EXAMPLE 13

Figure 16:
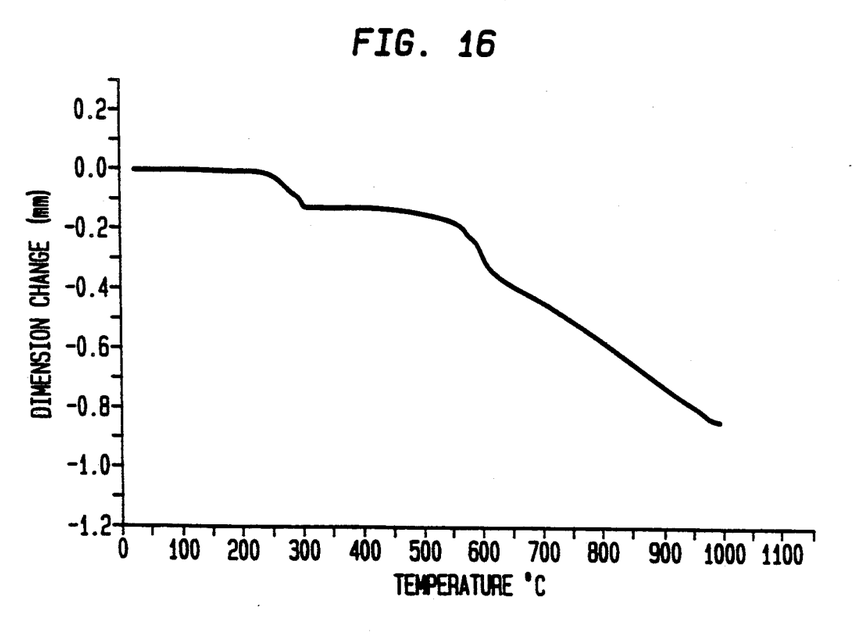

Material C of Example 5 was used as a starting material and mixed together with the following: 50 g material C of Example 5; 1.0 g iridium, as trichloride-tris-di-n-butylsulfide (the resinate contained 24% iridium metal), 25 g Ethyl Acetate; 25 g Lactol Spirits and 400 g ZrO$_2$ beads. The components were placed in a jar and mixed together on a roll mill so as to uniformly coat the powder with the resinate. The resulting material was tested in a dilatometer for shrinkage as described in Example 1. The resulting material contained 0.48% iridium. FIG. 16 shows the shrinkage results of the material.

Other properties which have been looked at in varying degrees include resistivity, grain growth and backlite density of fired films of internal electrodes screen printed on alumina substrates.

Looking at grain growth and film density using a scanning electron microscope it can be seen that there is a difference in films containing rhodium as compared to films with no additives or with iridium. While the iridium containing film shows the normal grain growth seen in films with no additives, the rhodium containing film shows little or no grain growth and consists of small spheres sintered together. The backlite density of the rhodium film is very low and has a high degree of porosity. The backlite density of the iridium containing film was very similar to the films with no additives but is slightly lower and this is to be expected because of the higher temperatures now required to fire the film.

I claim:

1. An internal electrode material consisting essentially of (a) an internal electrode powder selected from the group consisting of silver and mixtures of silver and palladium, and (b) a sinter control additive selected from the group consisting of one or both of an iridium metallo organic resinate and a rhodium metallo organic resinate, said sinter control additive being present in an amount sufficient to modify the sintering rate of the internal electrode powder so that the sintering occurs slower and over a wider temperature range as compared to the internal electrode powder without the sinter control additive.

2. The internal electrode material of claim 1, wherein the sinter control additive is present in an amount of from about 0.1 to 1.0 percent by weight of the internal electrode powder.

3. The internal electrode material of claim 2, wherein the sinter control additive is present in an amount of from about 0.1 to 0.5 percent by weight of the internal electrode powder.

4. The internal electrode material of claim 1, wherein the rhodium resinate is rhodium 2-ethylhexoate and the iridium resinate is iridium trichloride-tris-di-n-butylsulfide.

5. The internal electrode material of claim 1, wherein the conductive powder is a mixture of palladium and silver.

6. The internal electrode material of claim 5, wherein the mixture comprises 70 weight percent palladium and 30 weight percent silver.

7. The internal electrode material of claim 5, wherein the mixture comprises 60 weight percent palladium and 40 weight percent silver.

8. The internal electrode material of claim 5, wherein the mixture comprises 15 weight percent palladium, 85 weight percent silver.

9. The internal electrode material of claim 1, wherein the conductive powder is silver.

10. The internal electrode material of claim 1, wherein the sinter control additive is a mixture of an iridium metallo organic resinate and a rhodium metallo organic resinate.

11. The internal electrode material of claim 10, wherein the mixture of the iridium metallo organic resinate and the rhodium metallo organic resinate is present in a ratio of about 6:1 to 0.65:1 iridium resinate to rhodium resinate.

12. The internal electrode material of claim 11, wherein the ratio of iridium resinate to rhodium resinate is 2:1.

13. The internal electrode material of claim 1, which is in the form of a powder.

14. The internal electrode material of claim 1, in the form of an ink and containing a solvent based medium.

15. An internal electrode material comprising a mixture of palladium and silver as the conductive material and about 0.25 to 0.5 percent by weight of iridium trichloride-tris-di-n-butylsulfide.

16. An internal electrode material comprising a mixture of palladium and silver as the conductive powder and about 0.1 to 0.25 percent rhodium 2-ethylhexoate.

17. An internal electrode material comprising silver as the conductive powder and about 0.1 to 0.25% rhodium 2-ethylhexoate.

18. An internal electrode material comprising silver as the conductive powder and about 0.25 to 0.5% by weight of iridium trichloride-tris-di-n-butylsulfide.

19. The process of claim 18, wherein the internal electrode material is in the form of an ink and contains a solvent based medium.

20. A process for modifying the sintering rate of an internal electrode material comprising adding to a conductive powder selected from the group consisting of silver and mixtures of palladium and silver a sinter control additive selected from the group consisting of one or both of a rhodium metallo organic resinate and an iridium metallo organic resinate in an amount sufficient to modify the sintering rate of the internal electrode material so that the sintering occurs slower and over a wider temperature range as compared to the internal electrode powder without the sinter control additive.

21. The process of claim 20, wherein the sinter control additive is present in an amount of from about 0.1 to 1.0 percent by weight of the internal electrode material.

22. The process of claim 21, wherein the sinter control additive is present in an amount of from about 0.1 to 0.5 percent by weight of the internal electrode material.

23. The process according to claim 20, wherein the rhodium resinate is rhodium 2-ethylhexoate and the iridium resinate is iridium trichloride-tris-di-n-butylsulfide.

24. The process of claim 20, wherein the conductive powder is a mixture of palladium and silver.

25. The process of claim 24, wherein the mixture comprises 30 weight percent palladium and 70 weight percent silver.

26. The process of claim 20, wherein the mixture comprises 60 weight percent palladium and 40 weight percent silver.

27. The process of claim 20, where the mixture comprises 15 weight percent palladium and 85 weight percent silver.

28. The process of claim 20, wherein the conductive powder is silver.

29. The process of claim 20 wherein the sinter control additive is a mixture of an iridium metallo organic resinate and a rhodium metallo organic resinate.

30. The process of claim 29, wherein the mixture of the iridium metallo organic resinate and the rhodium metallo organic resinate is present in a ratio of about 6:1 to 0.65:1 iridium resinate to rhodium resinate.

31. The process of claim 30, wherein the ratio of iridium resinate to rhodium resinate is 2:1.

32. The process of claim 20, wherein the internal electrode material is in the form of a powder.

33. A process for modifying the sintering rate of an internal electrode powder comprising adding to a conductive powder, comprising a mixture of palladium and silver about 0.25 to 0.5 percent by weight of iridium trichloride-tris-di-n-butylsulfide.

34. A process for modifying the sintering rate of an internal electrode powder comprising adding to a conductive powder comprising a mixture of palladium and silver rhodium 2-ethylhexoate in an amount of about 0.1 to 0.25 weight percent.

35. A process for modifying the sintering rate of an internal electrode material comprising adding to a silver conductive powder about 0.25 to 0.5% by weight of iridium trichloride-tris-di-n-butylsulfide.

36. A process for modifying the sintering rate of an internal electrode material comprising adding to a silver conductive powder rhodium 2-ethylhexoate in an amount of about 0.1 to 0.25 weight percent.

37. A multilayer ceramic capacitor comprising at least two dielectric layers and at least one internal electrode layer disposed between the dielectric layers, said internal electrode layer consisting essentially of a conductive material selected from the group consisting of silver and mixtures of silver and palladium and a sinter control additive selected from the group consisting of an iridium metal and rhodium metal, said sinter control additive being present in an amount sufficient to modify the sintering rate of the internal electrode material so that the sintering occurs slower and over a wider range as compared to an internal electrode powder without the sinter control additive.

38. The multilayer ceramic capacitor of claim 37, wherein the sinter control additive is present in an amount of from about 0.1 to 1.0 percent by weight of the internal electrode material.

39. The multilayer ceramic capacitor of claim 37, wherein the sinter control additive is present in an amount of from about 0.1 to 0.5 percent by weight of the internal electrode material.

40. The multilayer ceramic capacitor of claim 37, wherein the conductive powder is a mixture of palladium and silver.

41. The multilayer ceramic capacitor of claim 37, wherein the conductive powder is silver.

42. The multilayer ceramic capacitor of claim 37, wherein the rhodium is initially added as rhodium 2-ethylhexoate and the iridium is initially added as iridium trichloride-tris-di-n-butylsulfide.

43. A multilayer ceramic capacitor comprising at least two dielectric layers and at least one internal electrode layer disposed between the dielectric layers, said internal electrode layer comprising a conductive material selected from the group consisting of silver and mixtures of silver and palladium and a sinter control additive selected from the group consisting of an iridium metal initially added as iridium trichloride-tris-di-n-butylsulfide and a rhodium metal initially added as rhodium 2-ethylhexoate, said sinter control additive being present in an amount sufficient to modify the sintering rate of the internal electrode material so that the sintering occurs slower and over a wider range as compared to the internal electrode powder without the sinter control additive.

44. The multilayer ceramic capacitor of claim 43, wherein the mixture comprises 30 weight percent palladium and 70 weight percent of silver.

45. The multilayer ceramic capacitor of claim 43, wherein the mixture comprises 60 weight percent palladium and 40 weight percent silver.

46. A multilayer ceramic capacitor comprising at least two dielectric layers and at least one internal electrode layer consisting essentially of a conductive material comprising a mixture of palladium and silver and about 0.25 to 0.5 percent by weight of iridium.

47. A multilayer ceramic capacitor comprising at least two dielectric layers and at least one internal electrode layer, said internal electrode layer consisting essentially of a mixture of palladium and silver as the conductive material and about 0.1 to 0.25 percent by weight rhodium.

* * * * *